(12) United States Patent
Anson

(10) Patent No.: US 10,795,551 B2
(45) Date of Patent: *Oct. 6, 2020

(54) METHOD FOR DISGUISING A COMPUTER SYSTEM'S LOGIN INTERFACE

(71) Applicant: NOWWW.US PTY LTD., Darlington (AU)

(72) Inventor: Mark Rodney Anson, Darlington (AU)

(73) Assignee: NOWWW.US Pty Ltd., Darlington (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,124

(22) Filed: Jul. 26, 2018

(65) Prior Publication Data

US 2018/0356951 A1 Dec. 13, 2018

Related U.S. Application Data

(63) Continuation of application No. 15/214,195, filed on Jul. 19, 2016, now Pat. No. 10,078,429.

(30) Foreign Application Priority Data

Jul. 20, 2015 (AU) ................................ 2015902882

(51) Int. Cl.
| | |
|---|---|
| G06F 21/00 | (2013.01) |
| G06F 3/0484 | (2013.01) |
| G06F 21/32 | (2013.01) |
| H04L 29/06 | (2006.01) |
| G06F 3/16 | (2006.01) |
| G06F 3/0488 | (2013.01) |
| G06F 21/36 | (2013.01) |

(52) U.S. Cl.
CPC ........ *G06F 3/0484* (2013.01); *G06F 3/04883* (2013.01); *G06F 3/167* (2013.01); *G06F 21/32* (2013.01); *G06F 21/36* (2013.01); *H04L 63/0428* (2013.01); *H04L 63/083* (2013.01)

(58) Field of Classification Search
CPC .... G06F 3/0484; G06F 21/36; G06F 3/04883; G06F 3/167; G06F 21/32; H04L 63/083; H04L 63/0428
See application file for complete search history.

(56) References Cited

U.S. PATENT DOCUMENTS

| | | | |
|---|---|---|---|
| 6,798,887 B1 * | 9/2004 | Andre ..................... | G06F 21/83 381/1 |
| 8,078,515 B2 | 12/2011 | John | |
| 8,145,912 B2 | 3/2012 | McLean | |
| 8,392,992 B1 * | 3/2013 | Spertus ................. | G06F 21/556 726/23 |
| 8,539,560 B2 * | 9/2013 | Angaluri ............. | H04N 9/3194 434/314 |
| 8,832,804 B1 * | 9/2014 | Casey ..................... | G06F 21/31 704/273 |

(Continued)

OTHER PUBLICATIONS

Wiedenbeck, et al., "Design and Evaluation of a Shoulder-Surfing Resistant Graphical Password Scheme", May 23-26, 2006, AVI '06, ACM, p. 177-184.

*Primary Examiner* — John B King

(74) *Attorney, Agent, or Firm* — Rosenberg, Klein & Lee

(57) ABSTRACT

A method for securing a computer system comprising a step of: disguising a password entry screen.

15 Claims, 11 Drawing Sheets

(56) References Cited

U.S. PATENT DOCUMENTS

| | | | | |
|---|---|---|---|---|
| 8,881,251 B1* | 11/2014 | Hilger | | H04L 63/083 |
| | | | | 713/183 |
| 9,886,570 B2* | 2/2018 | Bell | | G06F 21/36 |
| 2001/0000668 A1* | 5/2001 | Bodnar | | G06F 3/0236 |
| | | | | 715/764 |
| 2002/0070964 A1* | 6/2002 | Botz | | G06F 21/31 |
| | | | | 715/741 |
| 2004/0143346 A1* | 7/2004 | Francis | | G06F 19/326 |
| | | | | 700/1 |
| 2004/0172564 A1* | 9/2004 | Federova | | G06F 21/36 |
| | | | | 726/7 |
| 2005/0010768 A1* | 1/2005 | Light | | G06F 21/34 |
| | | | | 713/168 |
| 2006/0206918 A1* | 9/2006 | McLean | | G06F 21/36 |
| | | | | 726/2 |
| 2007/0006287 A1* | 1/2007 | Noda | | G06F 21/36 |
| | | | | 726/4 |
| 2007/0097076 A1* | 5/2007 | Gross | | G06F 21/31 |
| | | | | 345/163 |
| 2007/0273643 A1* | 11/2007 | Erez | | G06F 3/0338 |
| | | | | 345/156 |
| 2008/0235788 A1* | 9/2008 | El Saddik | | G06F 21/36 |
| | | | | 726/18 |
| 2008/0275748 A1* | 11/2008 | John | | G06Q 30/06 |
| | | | | 705/35 |
| 2009/0235197 A1* | 9/2009 | Chen | | G06F 21/36 |
| | | | | 715/780 |
| 2010/0318807 A1* | 12/2010 | Wang | | G06F 21/31 |
| | | | | 713/184 |
| 2012/0159609 A1* | 6/2012 | Griffin | | G06F 21/36 |
| | | | | 726/17 |
| 2012/0159613 A1* | 6/2012 | Griffin | | G06F 21/36 |
| | | | | 726/19 |
| 2013/0138968 A1* | 5/2013 | Yudkin | | G06F 21/602 |
| | | | | 713/183 |
| 2013/0219490 A1* | 8/2013 | Isbister | | G06K 9/00355 |
| | | | | 726/19 |
| 2014/0068503 A1* | 3/2014 | Yoon | | G06F 3/0488 |
| | | | | 715/790 |
| 2014/0129974 A1* | 5/2014 | Ben-Harrush | | G06F 3/0484 |
| | | | | 715/781 |
| 2015/0089621 A1* | 3/2015 | Khalid | | H04L 63/08 |
| | | | | 726/9 |
| 2015/0091805 A1* | 4/2015 | Mahajan | | G06F 3/021 |
| | | | | 345/168 |
| 2016/0012617 A1* | 1/2016 | Maetz | | G09C 5/00 |
| | | | | 345/593 |
| 2016/0044021 A1* | 2/2016 | Thibadeau, Sr. | | H04L 63/0807 |
| | | | | 713/159 |
| 2018/0114461 A1* | 4/2018 | Michalowitz | | G09B 5/062 |

\* cited by examiner

Page 21

The quick brown
fox jumped over
the lazy dog.

FIG 1

A HINGE CONNECTS
A COVER, A THIN SOLID
MATERIAL THAT OPENS
UP LIKE A BOOK SO THE
SCREEN OF THE DEVICE
CAN BE PROTECTED.

ADDITIONALLY, WHEN
THE COVER HAS "CLOSED"
THE DEVICE CAN TURN
OFF SO THAT IF THE DEVICE
IS LOST THE PERSON
FINDING THE DEVICE
CANNOT USE THE
DEVICE.

THE COVER MAY BE DESIGNED TO MOVE UP AND DOWN. WHEN THE SCREEN IS COVERED THE DEVICE IS OFF. WHEN IT IS UNCOVERED THE DEVICE MAY BE ON.

TOUCHSCREEN

THE COVER MAY BE REMOVED AND THEN ATTACHED TO THE BACK OF THE DEVICE.

TOUCHSCREEN

THE COVER MAY BE PUSHED DOWN A SMALL DISTANCE, SO THAT THE COVER CLICKS INTO A NEW POSITIONING.
WITH THE COVER POSITIONED IN THIS WAY, THE DEVICE MAY BE PLACED IN AN "ENGAGED" STATE WITH THE DEVICE "ON" BUT AT THE SAME TIME "LOCKED".

METHOD FOR DISGUISING A COMPUTER SYSTEM'S LOGIN INTERFACE

CROSS REFERENCE TO RELATED APPLICATIONS

The present application is a continuation of U.S. patent application Ser. No. 15/214,195, filed on Jul. 19, 2016. U.S. patent application Ser. No. 15/214,195 claims priority from Australian Provisional Patent Application Number 2015902882, entitled "A Method for Disguising a Computer System's Login Interface" filed on Jul. 20, 2015 and incorporated herein by reference as if recited below.

BACKGROUND OF INVENTION

Technical Field

The present invention pertains to the field of login systems for computers, portable communication devices and mobile phones.

Background Art

Security systems for portable communication devices feature a variety of login systems that typically include alphanumeric login systems. However, these login systems still remain vulnerable to persons seeking to hack into the systems and so gain unauthorized access to the information stored on the systems.

SUMMARY OF INVENTION

General problems with the background art, as identified by the inventor, include: the ability of unauthorized persons to guess passwords used to gain access to electronic communication systems.

Specific problems with the background art, as identified by the inventor, include: the systematization (standardization) of login systems, as typified by standardized alphanumeric interfaces, mean that guessing a password can be implemented in an algorithmic fashion. In contrast and central to the inventor's discovery is the realization that the use of non-standardized login layouts can be used to both disguise a mode of password entry, if observed at a distance by an unauthorized person, but also to disguise a login entry screen itself (obscuring the true nature of a login screen to an unauthorized third party).

Technical Problem

To ameliorate some of the effects of the general problems and the specific problems as recited above and in particular to provide, at least in part, a method to make guessing of a login password for an electronic system, difficult.

Technical Solution

Technical solution: disguising a login entry screen for an electronic system in such a way that the true nature of the screen cannot be detected by an unauthorized third party.

Advantageous Effects

Advantageous effects include: one of the principal advantages of the present invention is the ability to slow down and even prevent in many cases, unauthorized access to an electronic system, via the system's login entry screen (which could otherwise be used to commence a systematic attack upon the system).

BRIEF DESCRIPTION OF DRAWINGS

FIG. 1 discloses a disguised login interface in the form of a poem.

DETAILED DESCRIPTION

Best Mode

Definitions and Terms

The description in the body of the specification pertains to preferred modes of invention. Accordingly, features recited in the body of the specification should not be construed to be essential features of the invention unless explicitly indicated. Further, any reference in the body of the specification or the associated prosecution history to the word "invention" should be construed to imply a reference to preferred embodiments only.

"Disguising a password login display" means that the true nature of the display is concealed.

A "pictographic image" is an image that can depict: element(s) of a writing system, element(s) of a system of numbers and more generally any object or concept.

A "motion picture" is any form of depiction of images that gives the impression of continuous motion.

The systems described below are "interactive" in the sense that a user can communicate with a computer system using any device suitable for communication with the system including: keyboard instructions, a touch screen, a mouse, a joystick, voice commands, a pointer, a stylus or a user's finger to communicate with interactive graphics, interactive computer processes and interactive computer programs, where "interactive" means that there is electronic information exchange between the computer system and the user, when the user enters a question or command and the system responds: Adapted from the "*Microsoft Computer Dictionary*", Fifth Edition, 2002.

MODE FOR INVENTION

FIG. 1 discloses one mode of invention, according to one preferred embodiment, in which a simple rhyme is used to disguise the true nature of the image displayed—to disguise the true identity of a computer login screen. In the embodiment shown in FIG. 1, the password "eqlz2" could be entered by a user touching the screen at the location of the specific letters and numerals in question. However, as seen by reference to FIG. 1 the true nature of the screen can in fact be further disguised by using a plurality of pages for login purposes, where page 21 is in fact only one such page, thus compelling an unauthorized user to not only guess the correct password but also to guess the required page number for password entry purposes. That is, the system could be further configured only to permit access to the system if the password "eqlz2" is in fact entered on page 21.

Figure 2:
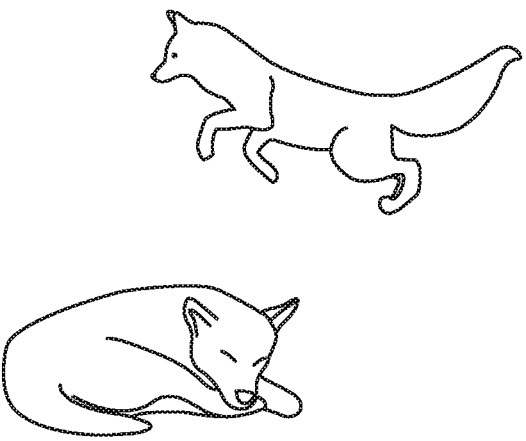
FIG. 2 discloses a disguised login interface in the form of a poem plus a picture.

FIG. 2 displays an additional embodiment of the present invention in which characters connected with a rhyme could need to be coupled with other objects, including animals. For example, it could be necessary to select the number 5, and the letters v, r and y and also to click on the fox's tail in order to initiate password entry.

In another embodiment, clicking on the fox's tail or any other object, could transform the tail or the object into a new object or take the user to a new set of images.

Figure 3:
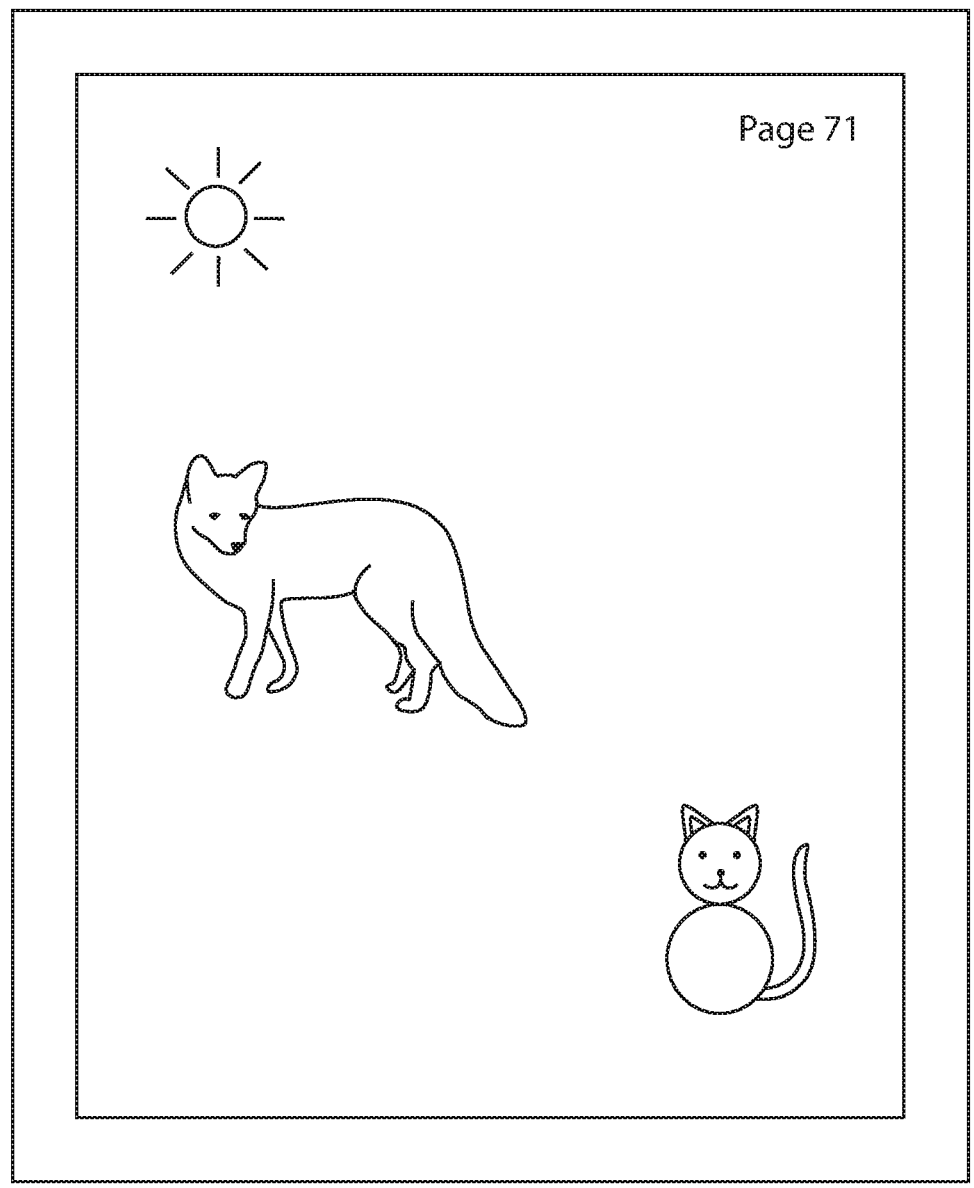
FIG. 3 discloses a disguised login interface in the form of pictures only.

FIG. 3 shows a final embodiment in which the image of a sun, a fox and a cat are displayed. In this case it could be necessary to click on the number 7, the sun and the cat's face in order to initiate password entry. However, it would be extremely difficult to guess the required password as the screen could in fact be merely one of many screens, which to all appearances would appear as little more than a collection of pages (images) selected from what appears to be an already opened file. In a further embodiment, the system could be configured to play a video film playing, where the user is then required to stop the film at a predetermined place in order to enter a prescribed password (further complicating the process so far as randomly guessing a password is concerned).

INDUSTRIAL APPLICABILITY

In use, a pocket sized, portable computer with internal circuitry for data encryption, data storage and data communication is described here for purposes of application of one embodiment of the present invention. The hardware circuitry of this device improves the rate of data encryption and decryption for encrypted data communications to a higher degree than what could be possible using software alone for data encryption. The device can include hardware for random number generation and other features that are optimal for an encrypted communications device. The device is designed to be pocket sized and has the capability of communicating with a person's mobile phone via WiFi as well as with other WiFi connected devices. The device has a number of ports and can make a connection to other devices via USB, HDMI or wireless. The device has a touchscreen interface within which a person using the device can see text, images or video.

In one embodiment of the device, a user can speak and a microphone within the device can record the speaker's voice while simultaneously using a camera within the device to film the speaker; then this data will be transformed into encrypted data by the data encryption hardware, with the encrypted data then being sent via the network interface to another device such as a securely paired mobile phone that can then transmit the encrypted data across a network to other devices. The other devices that receive the encrypted data can be devices that can decrypt the data and display that unencrypted data to a second person, or the other devices can include a data storage apparatus such as an internet cloud hosting service.

According to one embodiment, the device is an electronic device powered by electricity stored in a battery. To use the device it must first be turned on. This can be done by pushing a button on the front of the device, the side or back. Additionally, the device can be in a mode of operation where it becomes ready to use simply by picking up the device, which causes a motion detector circuit within the device to turn on the battery power and activate it. Alternatively, the device can be turned on by speaking to the device (the device being in a "sleep" mode where it uses minimal electrical energy while waiting for input). The device can then receive audio input and change to a state where the device is ready to interact with the user. At the time the machine is turned on, the circuit managing data processing can launch software stored on a storage media within the device and read a set of instructions from the software, then the circuit managing data processing can store a collection of data including executable instructions in the RAM of the device so that the circuit managing data processing is then in state of preparedness where it can process voice input and execute specific processes as a result of that input.

The login procedure for the device can occur as follows. A person turns on the device. When the device is turned on and awaiting user input, the user can see text displayed on the touchscreen. The text displayed on touchscreen could be different each time the device is turned on. The user can then speak words which he\she can read from the screen and the microphone on the device can receive this input and pass the input to the circuit that manages data processing, via the I/O interface. When a user speaks and the sounds of their spoken speech are passed to the circuit managing data processing, the audio input is then passed to the speech recognition module that receives and analyses the spoken speech and compares the current speaker's voice with the records of different people stored within the data storage medium of the device. If a match is made and a specific user is identified, the user can then see a message displayed on the screen which can take the form of a message saying "Welcome, Jim". After this is shown, the touchscreen interface will transform its appearance and the user can then see new text on the screen. For a user who has previously been granted a password such as the letters and numbers QF5WGZ the user can then be required to touch letters on the screen in the sequence QF5WGZ. The touchscreen area is scrollable and the user can need to scroll down to find a letter such as "Z" that is not immediately visible. When the user enters the correct sequence QF5WGZ the user can then be authenticated. After authentication, the user can then be shown new information on the touchscreen and he\she can see a set of objects that he\she can interact with such as a set of buttons for different applications or apps available on the device. For instance, the user could see a button for an app that allows the user to make an encrypted video or phone call to another person who also has a similar device.

In one embodiment of the device, the HDMI connector of the device could connect to a cable that connects to a television, further an external microphone could be attached to the microphone port, an external camera could be attached to the device via a USB connect, while a wireless connection to an internet connected WiFi router could simultaneously be made through the wireless interface. The WiFi router could connect to the internet and the device can send and exchange data with computers on the internet through that connection. The device can then be used to engage in an encrypted audio\video conversation with another person using a similar device, with the television then being used to view the other person and hear the person's voice.

In second embodiment of the device, the Ethernet connector of the device can be connected directly to an internet connected router via the router's Ethernet ports. The device can then be connected to a local area network, a LAN, and to the internet via that router. Software executed within the invented device, according to one preferred embodiment, could then be executed so that the device is able to monitor and manage all the other devices on the network, including the router itself. The invented device can, according to one preferred embodiment, be configured with software so the device can host a web server with the result that when a person connects to the IP address of the router the connection is passed to the internet web server running on the invented device. With this arrangement in place the device could be able to serve website content to machines that connect to it via the internet. This device linked to an internet connected router could be able to send and receive data such as encrypted voice and video data that are exchanged with other devices authorised and enabled to connect to embodiments of the device.

Figure 4:
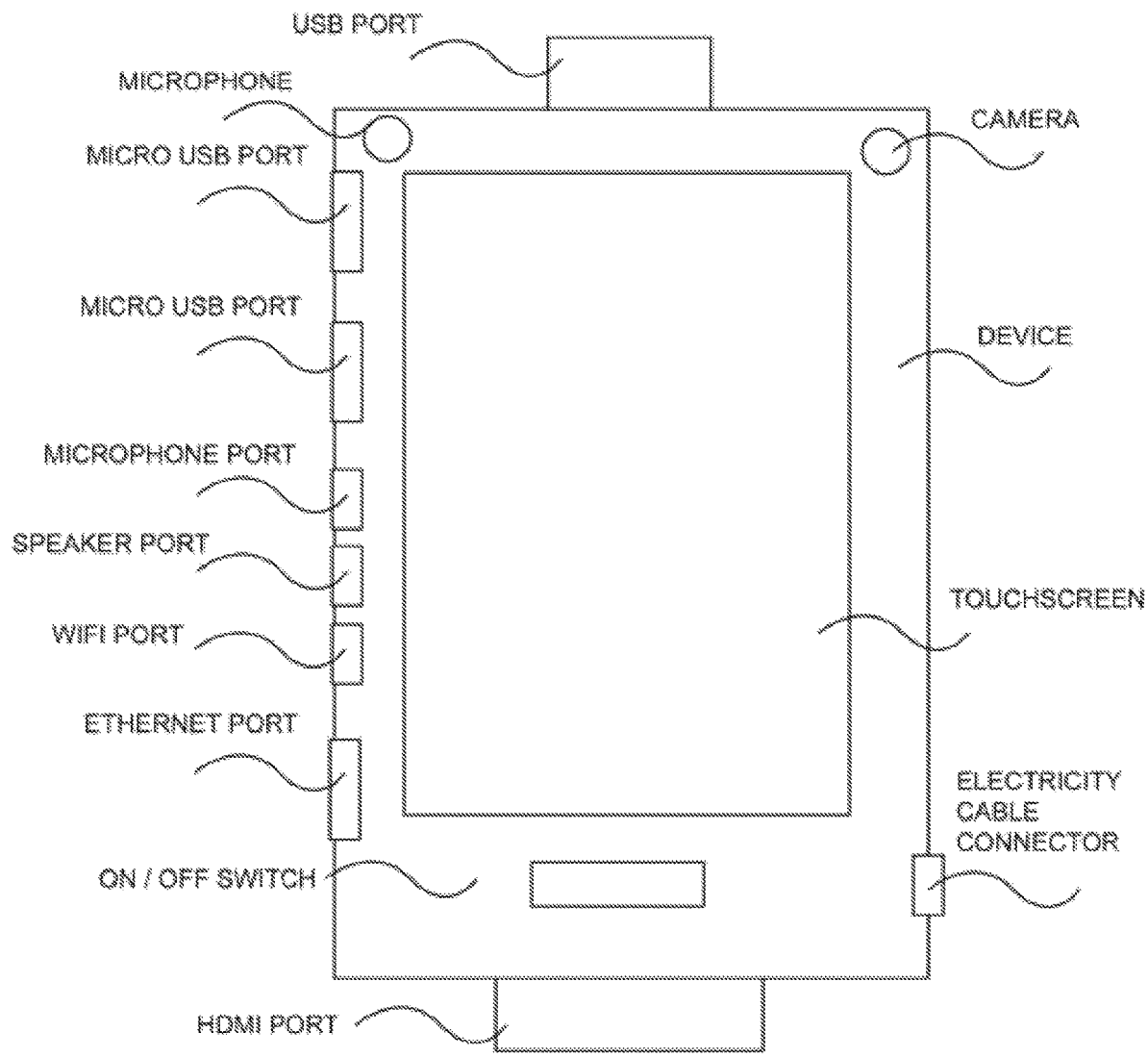
FIG. 4 discloses a portable communications device that can be used in association with embodiments of the present invention.

FIG. 4 shows the external design of the device. This diagram is presented as a depiction of the principal elements on the outside of a device that are seen by a user, however the design of a manufactured device can look substantially different—notwithstanding that the device could be pocket sized, with a touchscreen and with USB and/or HDMI connectors as well as a camera, microphone, WiFi connector and/or other interfaces.

The processes defined in FIGS. 1-3 can be run on the device shown in FIG. 4.

Figure 5:
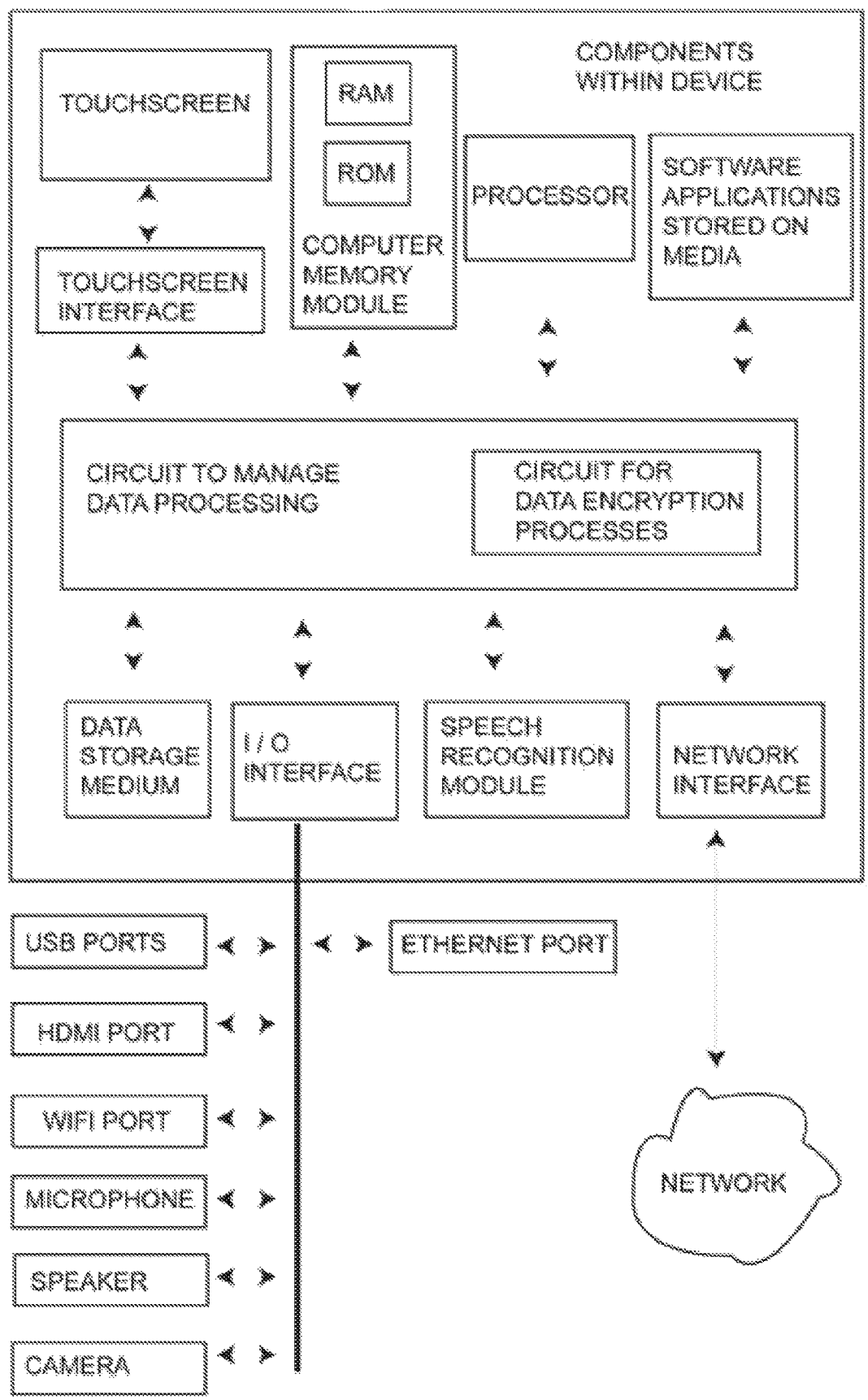
FIG. 5 discloses circuitry for a portable communications device that can be used in association with embodiments of the present invention.

FIG. 5 shows circuits and components within the device.

Figure 6:
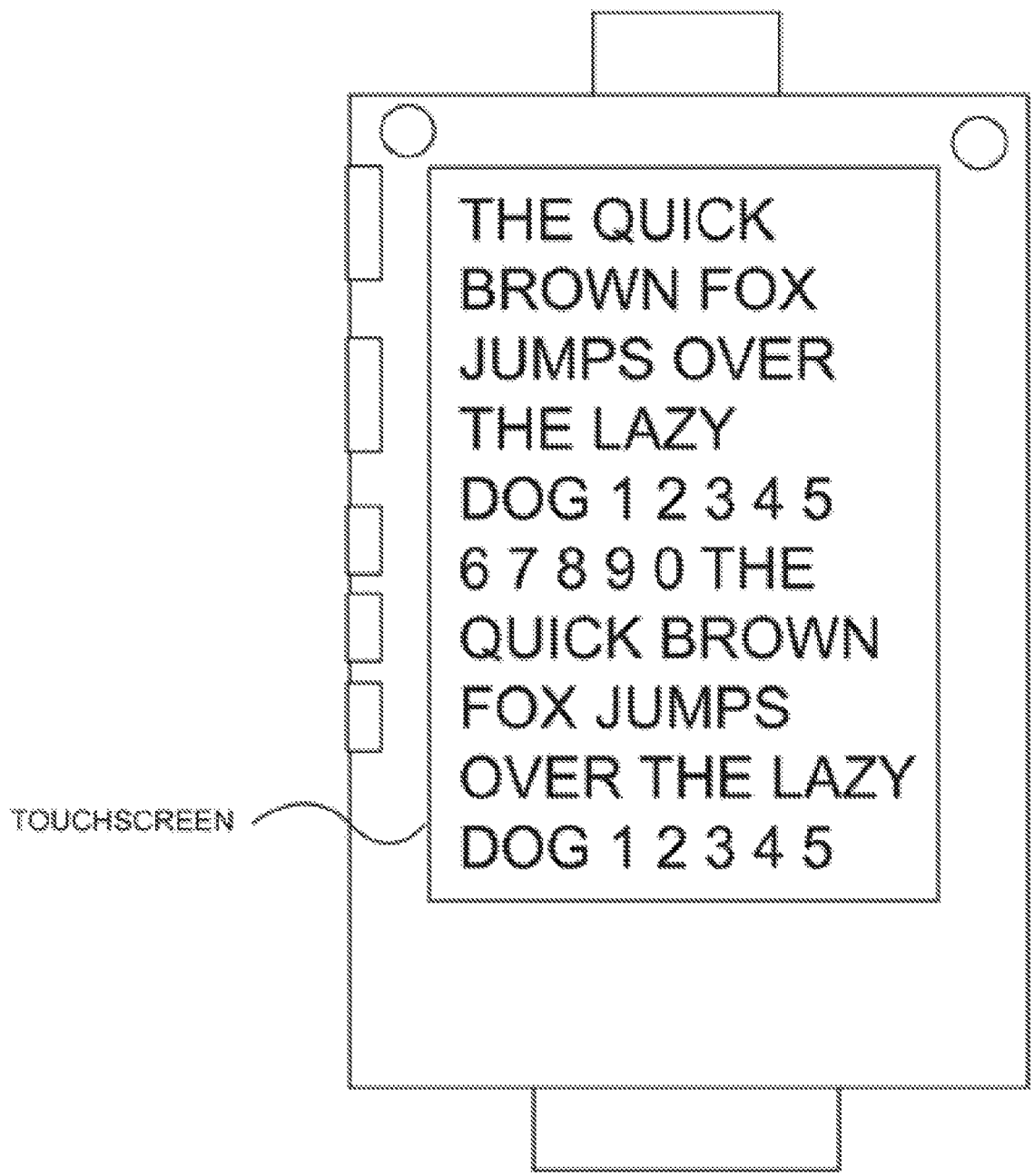
FIG. 6 shows a disguised login interface for use in association with embodiments of the present invention.

FIG. 6 shows text displayed on the touchscreen of a device when a user attempts to log in. The text displayed each time the device is used could be different and a user could be required to use the touchscreen "scroll down" feature and to continue reading new additional text so that the system can do a proper analysis of the user's voice and create a record of this current user within the data storage medium.

Figure 7:
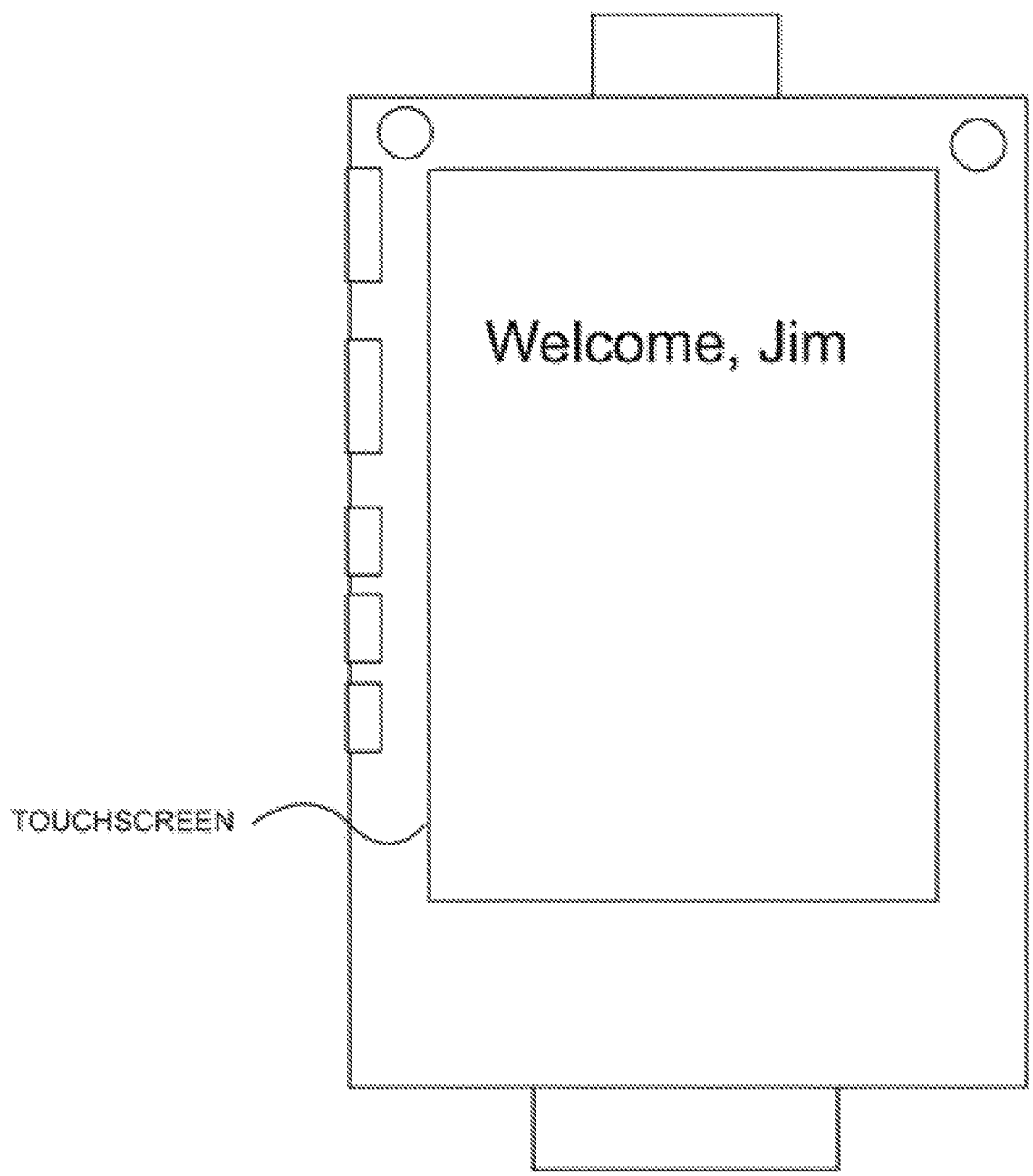
FIG. 7 discloses a welcome screen configured for a particular user.

FIG. 7 shows a message displayed to a user "Jim" with speech which corresponds to the user "Jim" whose specific user details are stored in the storage medium. At this juncture, the user Jim could speak and say, "OK" or some other sound, such that the information shown on the screen changes and new text is then shown to the user or alternatively the "Welcome, Jim" message can disappear after a few seconds delay.

Figure 8:
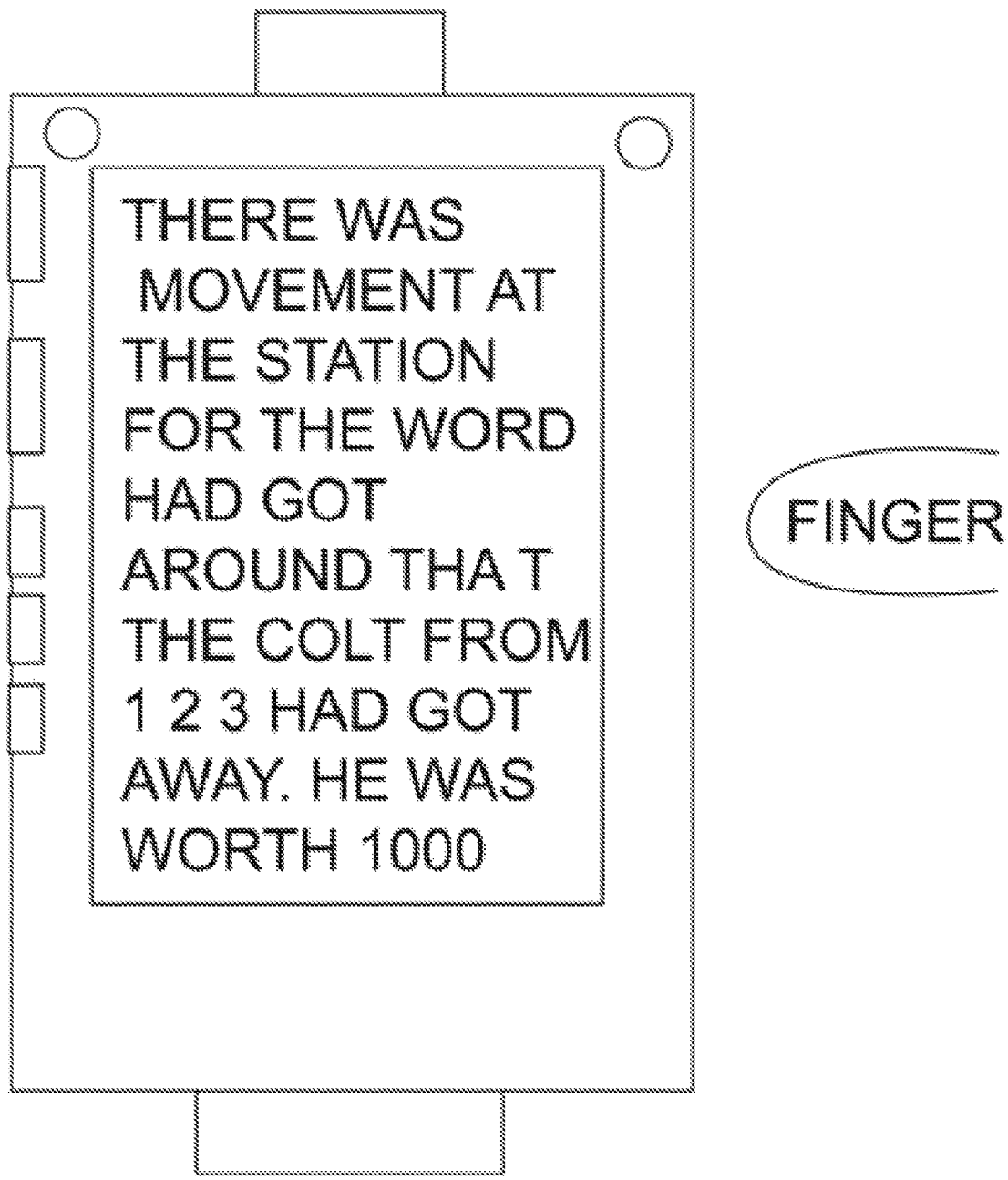
FIG. 8 discloses, in use, an implementation of the present invention, according to one embodiment.

FIG. 8 shows an example of random text that is displayed on the touchscreen after the user Jim is recognized by the device. A selection of random text is shown on the screen and the user Jim with a password such as "QF5WGZ" can touch letters on the screen, in the proper sequence, being "Q", "F", "5" and so forth. If a letter is not immediately visible on the screen, such as the letter "Z" which is not shown in FIG. 8, the user can interact with the touchscreen and scroll down the screen until a "Z" is visible and then touch the letter "Z".

When the user has entered the correct sequence of characters he\she can be authenticated. The user could then see a screen where he\she can interact with services available from the device, such as viewing passwords saved in text documents that are stored within the data storage media of the device. Naturally, in other embodiments, users could be discouraged from storing passwords on the device. The key aspect of this embodiment of the invention, in use, is that to a third party who has either stolen or found the device, the true nature of the password interface is "disguised" (the third party thinking that he\she has accessed a page from a file that has been opened after, but not before, the login screen has been used by the true owner of the device). This ability to disguise the login interface (to obscure the true purpose of the login interface) provides an added level of security in that it can trick an unauthorized user into thinking that he\she is merely accessing an internal data file of a "supposedly" already open system).

The device has a circuit to manage data processing, which according to one embodiment is shown in FIG. 5, as well as including software applications that are loaded by the device. When activated, the device has a set of executable instructions in operation within it, such that the software instructions can control the device. Those instructions can include instructions that allow a user to do things including creating text documents and saving data in text files, creating audio and video recordings, importing audio and video recordings and text files from other devices via WiFi connectivity or through the USB or HDMI ports, making phone calls to other devices, engaging in encrypted video and audio communications with other devices and a plurality of other features.

Figure 9:
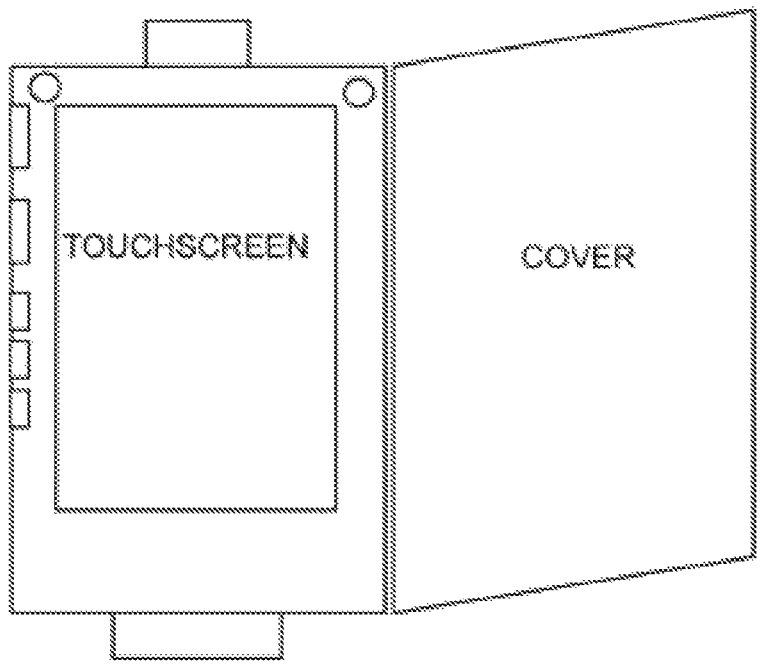
FIGS. 9-11 disclose the use of the device, according to preferred embodiments, further comprising a plurality of covers to protect the device.

FIG. 9 shows how a cover attached to the outside of the device can perform a multi-function role. The cover can protect the touchscreen of the device from being damaged. The cover can also contain a mechanism so that when the cover is over the screen then a mechanism within the hinge, the cover or the body of the device can be used to send a signal to the circuit that is managing data processing within the device, so that after receiving the signal the device can then be shut down and turned "off". A cover can be added to the device screen in different ways. In FIG. 9 one form of a cover is shown wherein the cover is attached to the device as in the case of a book with a hinge connecting the cover to the rest of the book.

Figure 10:
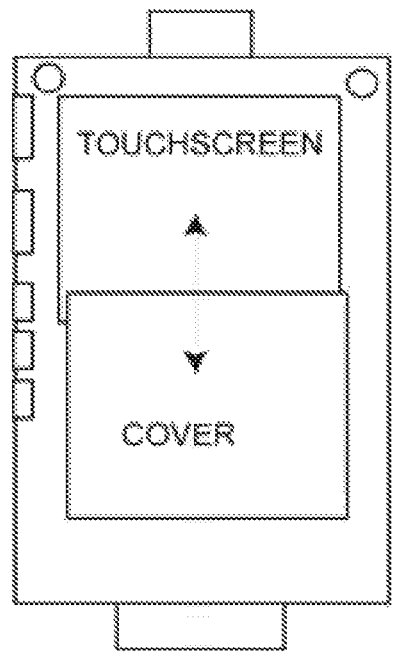

FIG. 10 shows a second type of cover, a cover that slides up and down to cover over the touchscreen. In this case, the touchscreen area could be smaller than the touchscreen area shown in FIG. 9.

Figure 11:
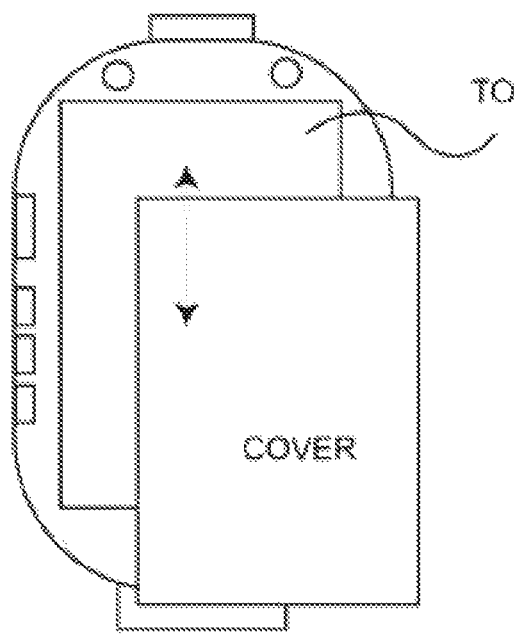
Figure 11:
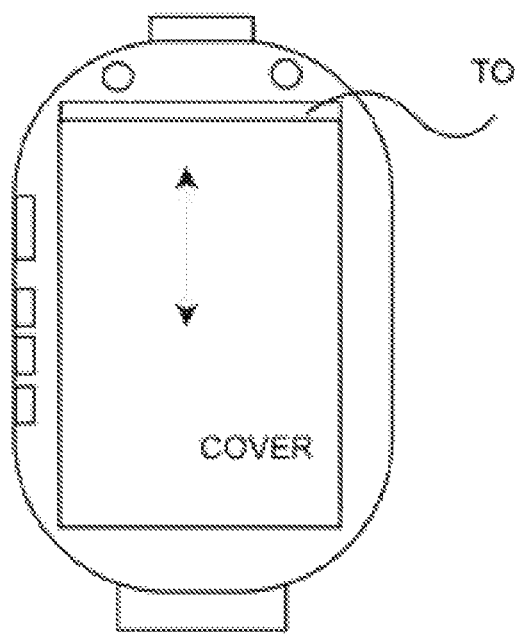

FIG. 11 shows an alternative form of the device, with the device having more rounded edges. FIG. 11 also shows how the cover can be removable, so that the cover can be taken off and then re-attached at the back of the device (so the cover will not be lost). In this case, where the cover is locked in place at the back of the device, the device can be set in an "engaged" state so that the device was operational but at the same time locked.

In the "engaged" state the device could continue transmitting data or engaging in other processes that are executed by a logged in user. However, no new processes can be started without the user again authenticating his\her identity and then initiating those new processes when the device is in the "engaged" state.

FIG. 11 also show another method by which the cover can be used to lock the device in the "engaged" state. The cover can be pushed down a small distance, for example a distance of 2 millimetres, and then the cover can "click" into a new, locked position. A signal can then be sent to the circuit managing data processing, initiating a process whereby the device can become locked in the "engaged" state.

RESERVATIONS

Copyright in drawings the subject of this application is reserved and remains the property of Mark Anson and his assigns.

What is claimed is:

1. A method for securing a computer system, the method comprising:

generating at least one password entry display on a screen of a computer system, the password entry display including a plurality of interactive password input points, each input point actuable to provide a password element without displaying a visual indicative response to actuation on the screen prior to completion of a correct password element sequence, whereby a password entry nature of the password entry display is concealed; and unlocking at least one locked application of the computer system responsive to completion of the correct password element sequence, wherein the password entry display is scrollable to reveal an additional region thereof on the screen, and at least one of the interactive password input points is positioned in the additional region.

2. The method as recited in claim 1, wherein at least one of the interactive password input points is overlaid in the password entry display with a pictographic image.

3. The method as recited in claim 1, wherein at least one of the interactive password input points provides a timed password element according to a currently-displayed frame of a motion picture image in the password entry display.

4. The method as recited in claim 1, wherein at least one of the interactive password input points is overlaid in the password entry display with an alphanumeric character included within alphanumeric text.

5. The method as recited in claim 1, wherein the password entry display has a visual style of a data file display.

6. A non-transitory computer readable medium encoded with instructions to perform a method comprising:

generating at least one password entry display on a screen of a computer system, the password entry display including a plurality of interactive password input points, each input point actuable to provide a password element without displaying a visual indicative response to actuation on the screen prior to completion of a correct password element sequence, whereby a password entry nature of the password entry display is concealed; and unlocking at least one locked application of the computer system responsive to completion of the correct password element sequence, wherein the password entry display is scrollable to reveal an additional region thereof on the screen, and at least one of the interactive password input points is positioned in the additional region.

7. The non-transitory computer readable medium as recited in claim 6, wherein at least one of the interactive password input points is overlaid in the password entry display with a pictographic image.

8. The non-transitory computer readable medium as recited in claim 6, wherein at least one of the interactive password input points provides a timed password element according to a currently-displayed frame of a motion picture image in the password entry display.

9. The non-transitory computer readable medium as recited in claim 6, wherein at least one of the interactive password input points is overlaid in the password entry display with an alphanumeric character included within alphanumeric text.

10. The non-transitory computer readable medium as recited in claim 6, wherein the password entry display has a visual style of a data file display.

11. A computer system comprising:

a screen;
a memory;
a processor; and
instructions stored in the memory for:

generating at least one password entry display on the screen, the password entry display including a plurality of interactive password input points, each input point actuable to provide a password element without displaying a visual indicative response to actuation on the screen prior to completion of a correct password element sequence, whereby a password entry nature of the password entry display is concealed, and unlocking at least one locked application of the computer system responsive to completion of the correct password element sequence, wherein the password entry display is scrollable to reveal an additional region thereof on the screen, and at least one of the interactive password input points is positioned in the additional region;

wherein the instructions are executed by the processor.

12. The computer system as recited in claim 11, wherein at least one of the interactive password input points is overlaid in the password entry display with a pictographic image.

13. The computer system as recited in claim 11, wherein at least one of the interactive password input points provides a timed password element according to a currently-displayed frame of a motion picture image in the password entry display.

14. The computer system as recited in claim 11, wherein at least one of the interactive password input points is overlaid in the password entry display with an alphanumeric character included within alphanumeric text.

15. The computer system as recited in claim 11, wherein the password entry display has a visual style of a data file display.

* * * * *